US007635809B2

(12) United States Patent
Higgs et al.

(10) Patent No.: US 7,635,809 B2
(45) Date of Patent: Dec. 22, 2009

(54) COVER FOR STRINGED INSTRUMENTS

(75) Inventors: Charles Higgs, Baltimore, MD (US); Duane R. Regula, Forest Hill, MD (US)

(73) Assignee: Trickguard, LLC, Baltimore, MD (US)

( * ) Notice: Subject to any disclaimer, the term of this patent is extended or adjusted under 35 U.S.C. 154(b) by 0 days.

(21) Appl. No.: 11/729,630

(22) Filed: Mar. 29, 2007

(65) Prior Publication Data

US 2008/0236360 A1 Oct. 2, 2008

(51) Int. Cl.
*G01D 3/00* (2006.01)

(52) U.S. Cl. ........................................................ 84/327

(58) Field of Classification Search .................. 84/267, 84/290, 291, 289, 327, 329, 421
See application file for complete search history.

(56) References Cited

U.S. PATENT DOCUMENTS

| | | | | |
|---|---|---|---|---|
| 3,375,747 | A | 4/1968 | Posey | |
| D240,855 | S | 8/1976 | Schneider | |
| D242,072 | S | 10/1976 | Schneider | |
| 4,177,847 | A | 12/1979 | Spindler | |
| 4,373,417 | A | 2/1983 | Wilson et al. | |
| D278,349 | S | 4/1985 | Peavey et al. | |
| 4,539,886 | A | 9/1985 | Hoffart | |
| D282,852 | S | 3/1986 | D'Aquisto | |
| 4,815,355 | A | 3/1989 | Caveness | |
| 4,905,298 | A | 2/1990 | Walor | |
| 4,977,808 | A | 12/1990 | Thacker | |
| 5,010,671 | A | 4/1991 | Stonehouse | |
| D320,222 | S | 9/1991 | Tornese | |
| 5,103,709 | A | 4/1992 | Foss, Jr. | |
| 5,258,214 | A | 11/1993 | Cooledge et al. | |
| 5,517,891 | A * | 5/1996 | Sica | 84/453 |
| D380,228 | S | 6/1997 | Ferguson | |
| 5,637,823 | A | 6/1997 | Dodge | |
| D458,955 | S | 6/2002 | Ridlinger | |
| 6,410,834 | B1 | 6/2002 | Hearfield | |
| 6,649,817 | B2 * | 11/2003 | Hartill | 84/267 |
| 6,660,352 | B2 | 12/2003 | Hsu et al. | |
| 6,723,908 | B2 | 4/2004 | Chapman et al. | |
| 6,933,430 | B2 | 8/2005 | Oslorep | |
| 2003/0140763 | A1 * | 7/2003 | Casamento | 84/290 |

OTHER PUBLICATIONS

Dan Zeff Guitars, Kling-On Guitar Products-Clear Top Protectors, Copyright Dan Zeff Guitars, 1999-2002.

* cited by examiner

*Primary Examiner*—Kimberly R Lockett
(74) *Attorney, Agent, or Firm*—J. Bruce Hoofnagle

(57) ABSTRACT

A cover 78*d*, having a static cling property, is formed in a cover perimeter pattern, and with a plurality of holes 82*b*, 84*b*, 98*b* and 100*b* in accordance with a cover hole-location pattern. The cover 78*d* is formed from a clear plastic static cling sheet 80, or a white plastic static cling sheet, each having a thickness of 7.5 mil, and may have a decorative design 110 applied to one surface thereof. In a preassembled guitar 48, strings 64 are located over a body top 52, with pickups 56 extending outward from the body top toward, but spaced from, the strings by a pickup-to-strings space, which is greater than 7.5 mil. While the guitar remains preassembled, the cover 78*d* can be moved into the pickup-to-strings space, and into static clinging engagement with the body top 48.

41 Claims, 4 Drawing Sheets

COVER FOR STRINGED INSTRUMENTS

BACKGROUND OF THE INVENTION

This invention relates to a cover for stringed instruments. More particularly this invention relates to a replaceable cover for assembly with a preassembled stringed instrument to assist in minimizing the effects of abusive treatment of a delicate finish of an exterior surface of the instrument. This invention further relates to a replaceable cover, for a preassembled stringed instrument, which displays a graphic design, and to methods of making the cover, and attaching the cover to the stringed instrument.

Stringed musical instruments, such as acoustic and electric guitars, including bass guitars, are formed with a body which may be composed of a material, such as wood or plastic. Typically, the exterior surface of the body of such instruments is formed with an attractive, but delicate, finish to enhance the aesthetic appearance of the body and the instrument.

When the stringed instrument is composed of wood, a stain and/or a varnish coating may be applied to the exterior surface thereof, which is then polished to provide the attractive, but delicate, finish. Where the instrument is composed of plastic, a fine, polished finish is formed on the exterior surface thereof to provide an attractive appearance.

Typically, such stringed instruments are handled by musicians and others before and after the use of the instruments to produce pleasing sounds in the form of music, and by the musicians during the production of music. During the handling of the instruments, the delicate finish thereof may be subjected to scarring, nicking, marring and other forms of similar external abuse, resulting in surface damage to the finish of the instruments, which, over time, can become unsightly.

Guitars, including acoustic guitars and electric guitars, have a basic structure which includes a body with a bridge mounted on a top thereof, a longitudinal neck extending from one side of the body at a neckjoint, a fretboard mounted on the top of the neck, a headstock at a free end of the neck, and a plurality of spaced, parallel strings extending between the bridge and the headstock, and over portions of the top and the fretboard.

When the guitar is used to produce music, the musician will pass, brush or strike the musician's fingers over, and in engagement with, a portion of the strings, which are adjacent the top of the body of the guitar. The striking motion of the musician's fingers is referred to as strumming, which results in vibrations in the strings. If desired, the musician may use an implement, referred to as a pick, to accomplish the strumming of the strings, rather than using the musician's fingers.

In particular, with respect to an acoustic guitar, the musician's fingers are strummed over the portion of the strings which are adjacent a sound hole formed in a soundboard, which is also the top of the guitar. As the strings are strummed, vibrations are developed in the portions of the strings over the sound hole, where the vibrations form musical tones.

With respect to an electric guitar, which is not formed with a soundboard or a sound hole, the musician's fingers are strummed over the portion of the strings which extend over spaced electrical pickups which extend outward from the top of the guitar. The pickups electrically sense the vibrations of the strings and amplify such vibrations as musical tones.

During the strumming of the strings by the musician, by hand or with a pick, specific surface portions of the delicate finish of the top of the guitar, which are adjacent the strummed portion of the strings, are subjected to repetitive strikes by the musicians fingers or the pick. This repetitive action results in the scratching, nicking, marring and general abuse of the specific surface portions of the top of the guitar, resulting in an eventual unattractive finish.

In the past, an overlay, or an insert, referred to as a pickguard, has been attached to specific surface portions of the top of the guitar to bear the brunt of the repetitive strikes applied by the musician during the strumming action. The pickguard is typically of a rigid construction, and may be formed from a durable, hard-wear material, such as, for example, plastic. Typically, the appearance of the pickguard is distinctly different from the delicate finish of the body of the guitar.

Examples of pickguards are illustrated in U.S. Pat. No. 5,103,709, which issued to Richard A. Foss, Jr. on Apr. 14, 1992; and U.S. Pat. No. 5,517,891, which issued to Marc V. Sica on May 21, 1996.

While each of the above-noted two U.S. patents show a structure and technique for providing a pickguard, the pickguard illustrated in each of the two patents cover and conceal the underlaying attractive and delicate surface of the body of the guitar, and require separate fasteners to secure the pickguard to the body. In addition, due to the thickness of the pickguard as disclosed in each of the above-noted two patents, the pickguard presents a raised surface which extends outward from the top of the body of the guitar. In order for the strings to be positioned for strumming, the bridge of each guitar must extend farther outward than it would if the pickguard was not used with the guitar.

Thus, there is a need for a cover for a stringed instrument which will assist in precluding the effects of abuse to the delicate finish of the stringed instrument during handling, and during strumming of the instrument.

In addition, there is a need for a cover which will protect the delicate finish of a stringed instrument, while allowing the delicate, but attractive, finish to be visible.

Further, there is a need for a cover which will protect the delicate finish of a stringed instrument without requiring the strings of the instrument to be placed at a higher-than-normal space from an adjacent portion of the top of the body of the instrument.

The pickguard is rigidly fastened to the top of the stringed instrument, and removal and/or replacement of the pickguard is quite time consuming and tedious. For example, multiple fasteners, electrical control knobs, a switch cap, and the strings, must be removed before the existing, or first, pickguard can be removed. If another, or second, pickguard is to be assembled with the stringed instrument after removal of the first pickguard, the second pickguard is placed on the top of the instrument, whereafter the fasteners, electrical control knobs, switch cap, and the strings, must be reinstalled. The stringed instrument must then be tuned.

Thus, there is a need for a cover for the delicate finish of a stringed instrument which does not require fasteners to facilitate attachment of the cover to the instrument, and which can be readily removed, reinstalled, and/or replaced without removal of fasteners and the strings of the instrument.

On occasion, and without having to remove an existing pickguard, the musician may wish to provide a visible decorative appearance for the top of the stringed instrument for aesthetic purposes, notwithstanding the presence or absence of a pickguard in assembly with the top. Also, at separate performances, and even during a single performance, the musician may wish to provide successive alternate decorative appearances for the top of the stringed instrument for a pleasing effect.

An interchangeable applique for a guitar is illustrated and described in U.S. Pat. No. 6,649,817, which issued to William T. Hartill, on Nov. 18, 2003. As described in this patent, a support base, similar to a pickguard, is attached to the top of the body of the guitar by the use of fasteners. An outboard surface of the support base is structured to receive the applique, whereby the applique is held in place by a variety of facilities external of any property of the applique. Such facilities include various forms of physical complementary structure between the base and the applique, a clear cover which is fastened to the base and over the applique, magnetic means, adhesive means, or a hook and loop fastener, Therefore, there is a need for a cover for a stringed instrument which has a visible decorative design thereon for assembly on the top of the instrument, notwithstanding the presence or absence of a pickguard, and without the necessity of facilities external of the cover to attach the cover to the top of the instrument.

Further, there is a need for covers for a stringed instrument, where each cover has a visible decorative design thereon which is different from the designs of the other covers, to provide for the interchangeability of covers of different decorative designs, notwithstanding the presence or absence of a pickguard, and without the necessity of facilities external of the cover to attach the cover to the top of the instrument.

SUMMARY OF THE INVENTION

Therefore, it is an object of this invention to provide a cover for a stringed instrument which will assist in precluding the effects of abuse to a delicate finish of the stringed instrument during handling, and during strumming of the instrument.

In addition, it is an object of this invention to provide a cover which will protect a delicate finish of a stringed instrument, while allowing the delicate finish to be visible.

Further, it is an object of this invention to provide a cover which will protect a delicate finish of a stringed instrument without requiring strings of the instrument to be placed at a higher-than-normal space from an adjacent portion of a top of a body of the instrument.

Also, it is an object of this invention to provide a cover for a delicate finish of a stringed instrument which does not require fasteners to facilitate attachment of the cover to the instrument, and which can be readily removed, reinstalled, and/or replaced without removal of fasteners and the strings.

Additionally, it is an object of this invention to provide a cover for a stringed instrument which has a visible decorative design thereon for assembly on a top of the instrument, notwithstanding the presence or absence of a pickguard.

Further, it is an object of this invention to provide covers for a stringed instrument, where each cover has a visible decorative design thereon which is different from the designs of the other covers, to provide for the interchangeability of covers of different decorative designs on a top of the instrument.

With these and other objects in mind, this invention contemplates a cover for a preassembled stringed instrument having a top and a mount extending from the top, which forms a component of the preassembled stringed instrument. The mount has a base perimeter at a juncture of the mount and the top, and the instrument further has strings extending over a portion of the top of the instrument. The cover includes a configured plastic sheet having a static cling property to facilitate removable securance of the cover to the top of the preassembled stringed instrument.

The configured plastic sheet is formed to facilitate placement of at least portions of the cover about at least portions of the base perimeter of the mount, when the cover is removably secured with the top of the preassembled stringed instrument adjacent the mount.

In addition, this invention contemplates a cover, for a preassembled stringed instrument, in which a configured plastic sheet has a first major surface which will face away from the top and toward the plurality of strings, when the cover is placed in removable securance with the top. Also, the configured plastic sheet has a second major surface, located on a side of the configured plastic sheet opposite the first major surface, for engaging the top of the preassembled stringed instrument, when the cover is placed in removable securance with the top. Further, the first major surface forms a wear surface which, when the cover is placed in removable securance with the top of the preassembled stringed instrument, the wear surface will absorb abuse to which the top may be subjected by forces externally of the preassembled stringed instrument.

Additionally, this invention contemplates a cover, for a preassembled stringed instrument, wherein a pickguard, having an exposed outer surface, is secured to the top of the preassembled stringed instrument, with the configured plastic sheet having the static cling property to facilitate removable securance of the cover to at least portions of the exposed outer surface of the pickguard.

Further, this invention contemplates a cover, for a preassembled stringed instrument, which includes the configured plastic sheet having a first major surface, and a second major surface, located on a side of the configured plastic sheet opposite the first major surface, and a graphic design formed on the first major surface of the configured.

Also, this invention contemplates a cover, for a preassembled stringed instrument, with a graphic design is comprised of multiple colors.

This invention also contemplates a cover, for a preassembled stringed instrument, formed by a configured plastic sheet having a perimeter, with a hole through the sheet, which is positionable at least partially about a mount on the instrument, when the cover is placed in removable securance with the pickguard. An open passage is formed in the sheet, which communicates with the hole and which extends from the hole through the perimeter of the sheet.

In addition, this invention contemplates a cover for a preassembled stringed instrument having an electric pickup extending outward from a top of the instrument, with the instrument further having strings extending adjacent the electric pickup, with a defined space of the stringed instrument being located, by a prescribed distance, between the strings and the pickup. The cover includes a configured plastic sheet having a static cling property and formed with a thickness dimension, which is less than the prescribed distance, to allow the cover to be moved laterally into the defined space between the strings and the electric pickup.

This invention also contemplates a guitar having a body formed with a top, with a mount extending outward from the top. A plurality of strings extend spatially over an adjacent portion of the top. A plastic cover, having a static cling property, is removably secured by static clinging engagement to the guitar between the adjacent portion of the top and the plurality of strings, and is configured to facilitate placement of the plastic cover about at least perimeter portions of the mount.

Also, this invention contemplates a guitar having a cover mounted thereon, with the cover having a graphic design applied to a surface of the cover.

In addition, this invention contemplates a guitar having a cover mounted thereon, with the cover having a wear surface which, when the cover is placed in removable securance with the preassembled stringed instrument, the wear surface will absorb abuse to which the top may be subjected by forces externally of the preassembled stringed instrument.

Further, this invention contemplates methods of making a cover for a preassembled stringed instrument, and methods of assembling the cover with the instrument.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 13 is a top view showing a cover for a guitar, formed in a sixth pattern of the several patterns, in accordance with certain principles of the invention;

DETAILED DESCRIPTION OF THE PREFERRED EMBODIMENTS OF THE INVENTION

Figure 1:
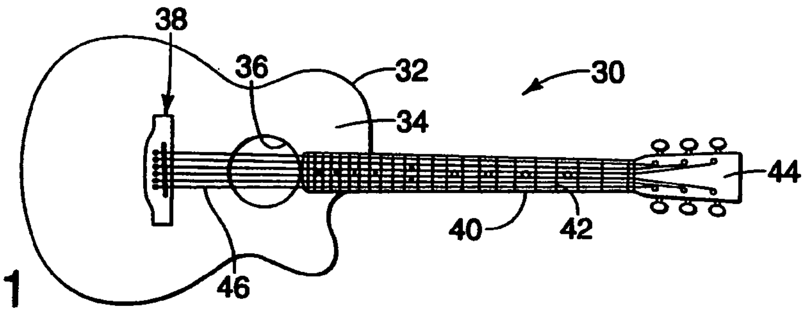
FIG. 1 is a top view showing an acoustic guitar.

Referring to FIG. 1, a preassembled stringed instrument, such as a preassembled acoustic guitar 30, is formed with a hollow body 32, including a soundboard or top 34 of the body. A sound hole 36 is formed in the top 34, and a bridge 38, or mount, which forms a component of the guitar 30, is mounted on the top, and has a base perimeter at a juncture of the bridge with the top. A neck 40, or mount, having a fretboard 42 on the top thereof, extends from one end of the body 32 to a headstock 44 at a free end of the neck. A first common end of each of a plurality of spaced strings 46 are secured to the bridge 38, and the strings extend over the sound hole 36, the neck 40, and are adjustably assembled, at a second common end thereof, with the headstock 44. The neck 40, the fretboard 42, the headstock 44, and the plurality of strings 46 are all components of the guitar 30. The neck 40 has a base perimeter at a juncture of the neck and the guitar top 34, at the neckjoint.

With the foregoing assembly of components, and other known necessary components, the preassembled guitar 30 is thereby formed as the preassembled stringed instrument.

Figure 2:
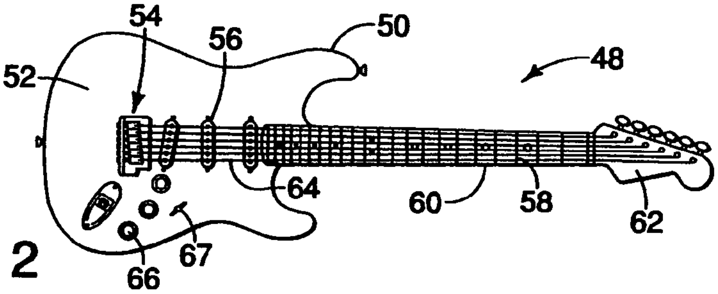
FIG. 2 is a top view showing an electric guitar.

As shown in FIG. 2, another preassembled stringed instrument, such as a preassembled electric guitar 48, is formed with a body 50, including a top 52. A plurality of components, or mounts, of the guitar 48 include a bridge 54, and a plurality of electronic pickups 56, all of which are mounted on the top 52 of the body 50. Other components, or mounts, of the guitar 48 include a neck 58 having a fretboard 60 on the top thereof, which extends from one end of the body 50, at the neckjoint, to a headstock 62 at a free end of the neck. A first common end of each of a plurality of spaced strings 64, which are also components of the guitar 48, is secured to the bridge 54, and the strings extend over the electronic pickups 56, the neck 58, including the fretboard 60, and are adjustably assembled, at a second common end thereof, to the headstock 62. Each of a plurality of control knobs 66, and a switch cap 67, all of which are associated with electrical facilities within the guitar body 50, associated with a selector switch (not shown) within the guitar body 50, are removably mounted on stems 68, or mounts, (FIG. 5), and are located spatially outward from the guitar top 52. The knobs 66, the cap 67 and the stems 68 are components of the guitar 48. With the foregoing assembly of components, and other known necessary components, the preassembled guitar 48 is thereby formed as the preassembled stringed instrument.

Guitars 30 and 48 are each an example of a preassembled stringed instrument, where at least the top thereof may be composed of a material such as, for example, wood or plastic. Other stringed instruments such as, but not limited to, violins, violas, bass and the like, are formed with tops composed of wood, or may be composed of plastic. Typically, the wood or plastic exterior surface of a stringed instrument, such as the top of a preassembled guitar, is treated and polished to provide an attractive and aesthetically pleasing appearance. However, such treated and polished surfaces are delicate and sensitive. When such surfaces are subjected to exterior abuse, typically encountered in the use of stringed instruments in the production of musical tones, the surfaces become marred and unsightly, over time.

It is noted that, with respect to electric guitars, the pickups include a housing and electronic devices therein, which detect vibrations of the strings and facilitate the transformation of the vibrations into electrical signals for subsequent amplification. In some types of guitars, the electronic devices have portions which are partially exposed and extend adjustably outward from the housing of the pickup toward the guitar strings. In other types of guitars, the devices are concealed within the housing, which is adjustable with respect to the guitar strings.

The electronic devices may be adjustably set, by personal preference of the musician, in close relation to the guitar strings. However, the strings are not in physical contact with the partially exposed devices or the housing of the concealed devices, at least when the guitar is at rest, i.e., not being used to produce music. In this instance, the strings are separated from the partially exposed devices, or the housing of the concealed devices, by a distance which is greater than 7.5 mil (0.0075 inch) (0.0019 mm). For purposes of the description below, the adjustable close relation between the guitar strings and exposed portions of the devices, or the housing of the concealed devices, will be referred to as the adjustable pickup-to-strings space.

Another type of guitar, referred to alternatively as a bass, an electric bass, or a bass guitar, is similar in appearance to the electric guitar 48, but is physically larger in some respects, and is tuned to play lower in pitch than the guitar 48. It is to be understood that, in any description heretofore, and below, regarding the guitar 48, such description will also be in regard to the electric bass.

Figure 3:
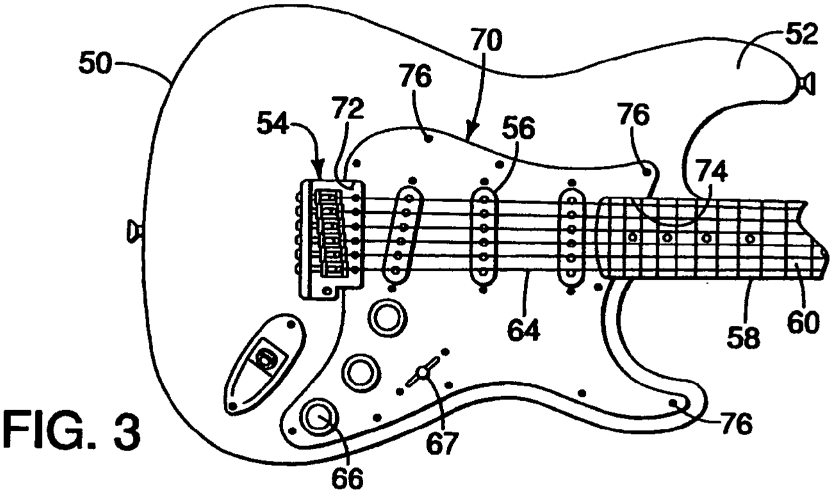
FIG. 3 is a partial top view showing the electric guitar of FIG. 2 with a pickguard assembled on the top of the guitar.
Figure 6:
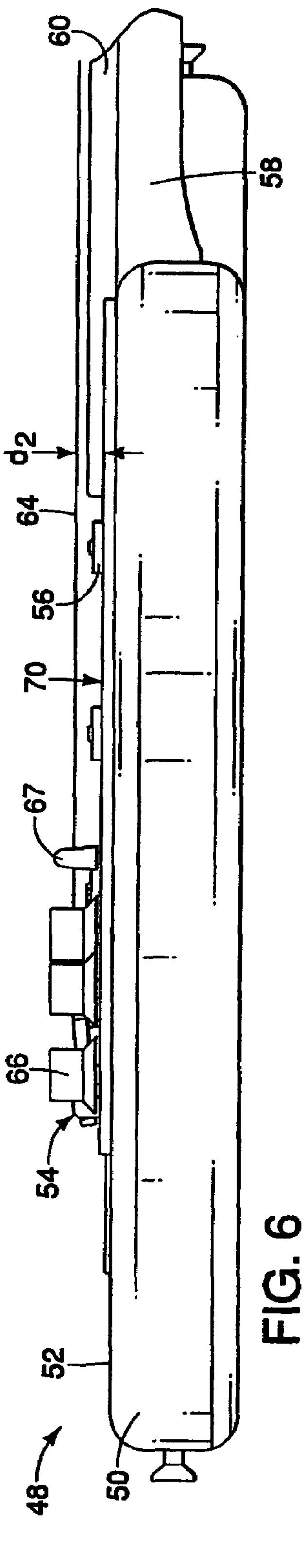
FIG. 6 is a partial side view showing the electric guitar of FIG. 3, with the pickguard assembled therewith.

As shown in FIGS. 3 and 6, a rigid plastic element, such as a pickguard 70, may be assembled over a specific portion of the top 52 of the electric guitar 48. The pickguard 70 is formed with a prescribed pickguard perimeter pattern, and with preformed pickguard holes, arranged in accordance with a prescribed pickguard hole-location pattern, within the prescribed pickguard perimeter pattern. The preformed pickguard holes facilitate securance of the pickguard to the guitar 48, and accommodate receipt of the pickups 56 and the stems 68, and portions of the bridge 54 and the neck 58 at the neckjoint, when the pickguard 70 is assembled with the guitar, as noted below.

The pickguard 70 is formed with an exposed outer surface when in assembly with the guitar 48, which is designed to absorb any abusive forces to which the guitar may be subjected in the musical-production use, or handling, of the guitar. The exposed outer surface of the pickguard 70 is typically and distinctively different in appearance from the surface of the top 52 of the guitar 48, with which it is assembled.

It is noted that the use of the pickguard 70 is optional, and the user of the guitar 48 may choose not to use a pickguard, thereby allowing the attractive surface of the top 52 of the guitar to continue to be fully exposed, and, undesirably, in position for the abuse in the manner noted above.

The pickguard 70 may be assembled with the top 52 of the guitar 48 at the time the remaining components of the guitar are initially being assembled. For example, after the bridge 54, the pickups 56, the neck 58, and the stems 68, have been assembled with the body 50 of the guitar 48, but before the strings 64, the knobs 66 and the cap 67 have been assembled with the guitar, the pickguard 70 is placed on the top 52 of the body 50 in the manner shown in FIGS. 3 and 6.

It is noted that the pickguard 70, as shown in FIG. 3, is formed with a first cut-out portion 72, which fits in complementary fashion about an adjacent portion of the bridge 54, and with a second cut-out portion 74, which fits in complementary fashion about the neck 58 at the a neckjoint. Further, preformed holes are formed in the pickguard 70, which are positionable over, and around, the pickups 56 and the stems 68, the pickups 56 and the stems 68 extend outward from the exposed outer surface of the pickguard, with a base perimeter of each of the pickups and the stems being formed at a juncture of the pickups and the stems with the exposed outer surface of the pickguard.

Thereafter, fasteners, such as screws 76, are inserted through preformed pickguard holes in the pickguard 70, and are threadedly moved into corresponding fastener holes (not shown) formed in the guitar top 52 to secure the pickguard to the body 50 of the guitar 48. The locations of the preformed pickguard holes for receipt of the fasteners 76 are established by the pickguard hole-location pattern, and are located slightly inboard of the perimeter of the pickguard 70. The strings 64 may then be assembled with the bridge 54 and the headstock 62 as noted above, and the knobs 66 and cap 67 placed over the respective stems 68.

It is noted that, by virtue of the fasteners 76 being assembled with the guitar 48, to secure the pickguard 70 with the guitar, the fasteners are considered to be components of the preassembled stringed instrument, and are thereby considered to be mounts, with the heads of the fasteners forming a base perimeter of the fasteners.

With normal handling and use of the guitar 48, the surface finish of the pickguard 70 can, over time, become unsightly. If, for any reason, the user decides to remove and/or replace the assembled pickguard 70, at least one common end of each of the strings 64 are detached from the bridge 54, and/or the headstock 62, and the strings are peeled back, or removed, from a location directly outward from the top 52 of the guitar 48. The knobs 66 and the cap 67 are also removed, and the screws 76 are withdrawn, whereafter the assembled pickguard 70 may be removed from assembly with the top 52 of the guitar body 50.

If a replacement pickguard 70 is to be assembled with the top 52 of the guitar 48, the assembly procedure noted above must be followed. The detached ends of the strings 64 must be reassembled thereafter with the bridge 54, and/or the headstock 62 if previously unassembled, and the guitar 48 must be tuned.

Obviously, the effort for any process of the assembly or the reassembly of the pickguard 70 with, or the disassembly of the pickguard from, the top 52 of the guitar 48 is very time-consuming and tedious, which is further compounded when an assembled pickguard is to be removed and a replacement pickguard is to be assembled.

It is noted that decorative pickguards for guitars are commercially available, but only in a relatively few colors or finishes, and they are very expensive. In addition, the processes of assembling and/or replacing pickguards 70 on, or removing pickguards from, the guitar top 52 requires a skill level which is not normally possessed by the average user of the guitar 48.

In some instances, users of stringed instruments such as, for example, the guitar 48, may wish to artistically customize their guitar with painted graphics, which is a costly and time consuming process. If the user wishes to alter or remove the painted graphics, such a task is difficult, tedious, time consuming and costly, and could damage the delicate finish of the top of the guitar.

Figure 9:
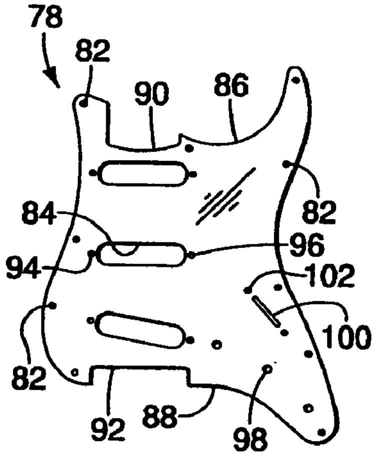
FIG. 9 is a top view showing the one embodiment of the cover of FIG. 7, formed in a second of the several patterns, in accordance with certain principles of the invention.
Figure 10:
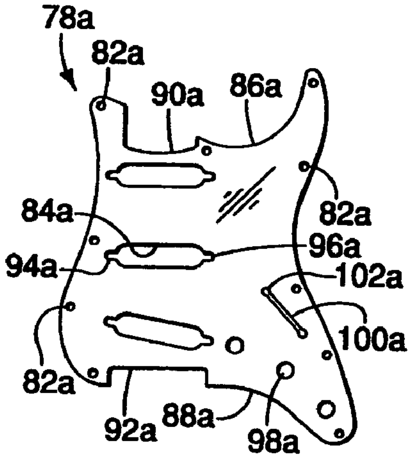
FIG. 10 is a top view showing a second embodiment of the cover of FIG. 7, formed in a third of the several patterns, in accordance with certain principles of the invention.
Figure 11:
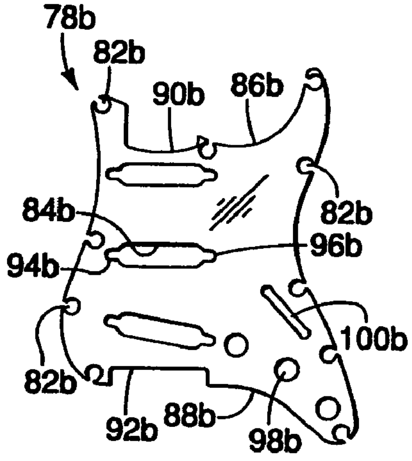
FIG. 11 is a top view showing a third embodiment of the cover of FIG. 7, formed in a fourth of the several patterns, in accordance with certain principles of the invention.
Figure 15:
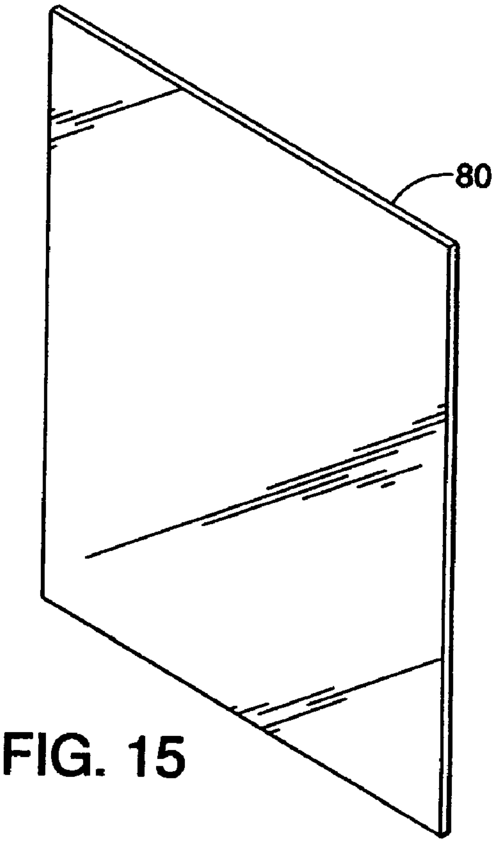
FIG. 15 is a perspective view showing a sheet of clear plastic material having a static cling property.

Referring to FIGS. 9, 10 and 11, each of a plurality of clear plastic covers 78, 78*a* and 78*b*, respectively, for assembly, by static cling, on the top 52 of the guitar 48, can be formed or configured from a clear, transparent plastic sheet 80, shown in FIG. 15, which has embodied therein a static cling property. The clear plastic sheet 80 is formed with an uncovered first major surface on one side of the sheet, and a second major surface on an opposite side of the sheet, with a paper backing sheet located on, and covering, the second major surface.

The clear plastic sheet 80 is cut, shaped or trimmed, in a manner noted below, to form a configured plastic sheet, leading to the ultimate formation of each of the covers 78, 78*a* and 78*b*, as illustrated. Each of the covers 78, 78*a* and 78*b* formed thereby, have a static cling property, with a first major surface of each cover being uncovered, and portions of the backing sheet remaining on a second major surface of the cover.

Figure 4:
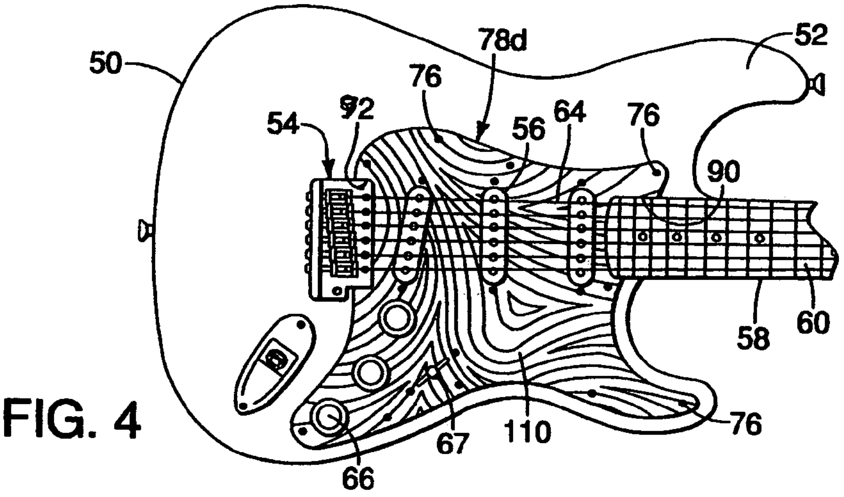
FIG. 4 is a partial top view showing the electric guitar of FIG. 2 with a cover, formed in a first of several patterns and having a decorative graphic design thereon, assembled on the pickguard of FIG. 3 which is in assembly with the electric guitar, in accordance with certain principles of the invention.
Figure 16:
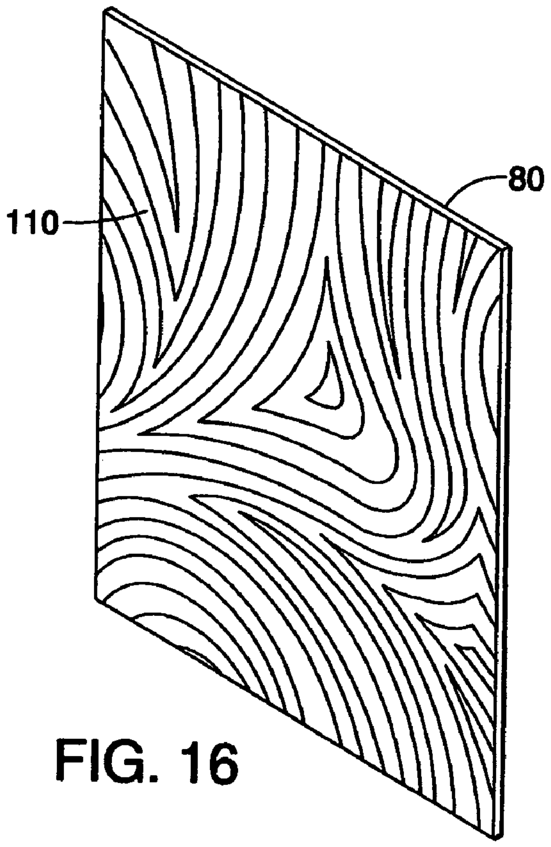
FIG. 16 is a perspective view showing the plastic sheet of FIG. 15 having a decorative graphic design formed on one major surface thereof in preparation for forming the cover of FIG. 4, in accordance with certain principles of the invention.

A decorative cover 78*d*, as shown in FIG. 4, for assembly, by static cling, on the top 52 of the guitar 48, can be formed by printing, or applying, a graphic design 110 (FIG. 16) onto the previously uncovered first major surface of the clear plastic sheet 80, with the second major surface of the clear plastic sheet remaining covered by the paper backing sheet. Thereafter, the clear plastic sheet 80, with the graphic design 110, is cut, shaped or trimmed, to form the configured plastic sheet, in the manner noted above with respect to the formation of the covers 78, 78*a* and 78*b*. This results in the forming of the decorative cover 78*d* having a graphic design on a first major surface thereof, as shown in FIG. 4, with portions of the backing sheet remaining on a second major surface thereof.

The graphic design 110 can be comprised of multiple colors, further enhancing the aesthetics of the ultimate cover 78*d*. In this embodiment, the previously uncovered first major surface of the cover 78*d* has a decorative graphic design thereon, which, as noted above, can be multi-colored.

There are many commercially-available printers, well known to those in the commercial printing business, which can be used to apply the decorative graphic design 110 onto the first major surface of the clear plastic sheet 80, and many commercially-available cutters, well known to those in the commercial printing business, which can be used to cut, shape or trim, the clear plastic sheet, with or without the graphic design.

While the shape of the perimeter of the sheet 80 is shown in FIG. 15 as being square or rectangular, the perimeter of the sheet could be any other shape without departing from the spirit and scope of the invention, provided that the sheet is of sufficient size to facilitate the ultimate formation of the covers 78, 78*a*, 78*b* and 78*d*, and other covers described below.

Each of the covers 78, 78*a*, 78*b* and 78*d* is formed from a configured plastic sheet having a static cling property which facilitates removable securance of the cover to a top, or a pickguard, as described below, of a preassembled stringed instrument, such as, for example, the preassembled guitar 48. Further, the configured plastic sheet is formed, shaped or trimmed, to facilitate placement of at least portions of each of the covers 78, 78*a*, 78*b* and 78*d* about at least portions of a base perimeter of any mount, or component, extending from the top, or the pickguard, of the preassembled stringed instrument, where the base perimeter is located at a juncture of the mount and the top, or at a juncture of the mount and the exposed outer surface of the pickguard.

Figure 7:
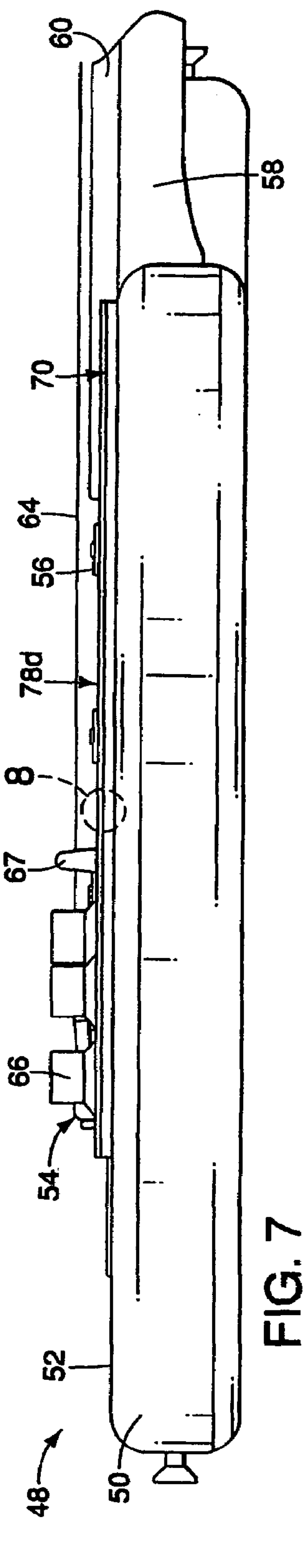
FIG. 7 is a partial side view showing the electric guitar of FIG. 3, with a pickguard assembled therewith, as in FIG. 3, and the cover of FIG. 4 assembled over the pickguard, illustrating one embodiment of the cover, formed in the first of several patterns noted above in the description of FIG. 4, in accordance with certain principles of the invention.
Figure 8:
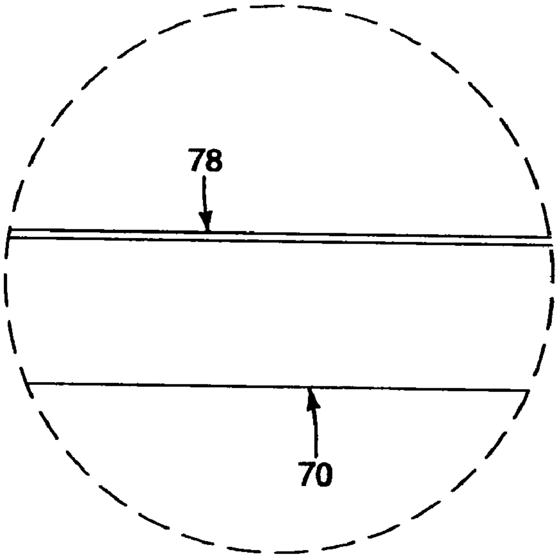
FIG. 8 is a partial sectional view, taken from FIG. 7, showing a covering relationship of the one embodiment of the cover over the pickguard, in accordance with certain principles the invention.

Examples of a component, or a mount, of a preassembled stringed instrument, such as, for example, the guitar 48, include, but are not limited to, the bridge 54, each of the electric pickups 56, the neck 58 and the fretboard 60 at the neckjoint, each of the stems 68, and the head of each of the fasteners which may extend from the top 52 of the guitar 48, including the fasteners 76, and the fasteners associated with the electric pickups and the selector switch. In addition, as described below, the pickguard 70 (FIGS. 6, 7 and 8) is also a component, or a mount, of the preassembled stringed instrument, such as guitar 48, as well as any heads of fasteners, which may extend outward from the pickguard.

The perimeter of each of the covers 78, 78*a*, 78*b* and 78*d* is formed with a cover perimeter pattern, as illustrated in FIGS. 9, 10, 11 and 4, respectively, which is identical to the prescribed pickguard perimeter pattern noted above. The cover perimeter pattern of each of the covers 78, 78*a*, 78*b* and 78*d* is formed in the prescribed pickguard perimeter pattern, by cutting, shaping or trimming, the plastic sheet.

Each of the covers 78, 78*a* and 78*b* is thereby formed with an uncovered first major surface, and the cover 78*d* is formed with a design-covered first major surface. Also, each of the covers 78, 78*a*, 78*b* and 78*d* is thereby formed with a second major surface covered by portions of the backing sheet, with the first and second major surfaces being on opposite sides of the cover.

Further, each of the covers 78, 78*a*, 78*b* and 78*d* are formed with holes, as noted below, in accordance with a cover hole-location pattern within the boundary established by the cover perimeter pattern. The cover hole-location pattern of each of the covers 78, 78*a*, 78*b* and 78*d* is identical to the prescribed pickguard hole-location pattern.

As noted above, there are many commercially-available cutters, well known to those in the commercial printing business, which can be used to cut, shape or trim, the plastic sheet 80, with the graphic design 110, in the cover perimeter pattern, and with holes in the cover hole-location pattern, in the manner described above.

The clear plastic sheet 80 has a thickness of 7.5 mil, and is composed of a material such as, for example, polyvinyl chloride. In addition, the clear plastic sheet 80, which has embodied therein a static cling property, is commercially available, and is referred to as a clear static cling vinyl, an example of which is identified below. In this manner, each of the plastic covers 78, 78*a*, 78*b* and 78*d*, ultimately formed from the sheet 80, has a static cling property.

As an alternative to using the clear plastic static cling sheet 80 with the graphic design 110 to form the cover 78*d*, a white plastic static cling sheet, on which the graphic design may be printed or applied, may be used in the forming of the cover 78*d*. The white plastic static cling sheet is composed of a material such as, for example, polyvinyl chloride, and has a thickness of 7.5 mil. The white plastic static cling sheet is commercially available, and is referred to as a white static cling vinyl, an example of which is identified below.

The clear plastic static cling sheet 80 and the white plastic static cling sheet, noted above, could each be of a thickness other than 7.5 mil, such as, for example in a range between 5 mil and 8 mil, without departing from the spirit and scope of the invention.

The portion of the backing sheet, which remains with the second major surface of each of the covers 78, 78*a*, 78*b* and 78*d*, may be removed and the cover can then be placed in interfacing engagement with the guitar top 52, or the pickguard 70, to facilitate removable securance of the cover with the guitar 48, as described in more detail below.

Each of the covers 78, 78*a*, 78*b* and 78*d* are formed with the same cover perimeter pattern, and are generally formed, within the perimeters thereof, with holes in accordance with the cover hole-location pattern. Generally common features within the perimeter of the cover 78 will be described below, with the understanding that such common features of the covers 78*a*, 78*b* and 78*d* are similar. Where the features amongst the covers 78, 78*a*, 78*b* and 78*d* differ, a description of the differences is also provided below.

Referring to FIG. 9, as noted above, the cover 78 is formed with the above-noted cover perimeter pattern, and with holes noted below in accordance with the above-noted cover hole-location pattern. Within the perimeter of the cover 78, a plurality of small spaced screw-head-accommodating holes 82, each with a surrounding enclosed border, are formed immediately adjacent and inboard of the perimeter. The holes 82 provide a clearance of the cover 78 from engagement thereof with heads of the fasteners 76 (FIGS. 3 and 4), which secure the pickguard 70 with the guitar 48.

Three spaced elongated holes 84 are formed in the cover 78, between spaced opposite sides 86 and 88 of the cover 78, which provide a clearance of the cover 78 from engagement thereof with the pickups 56 (FIGS. 3 and 4). A first cut-out portion 90 is formed in the portion of the perimeter of the cover 78, inclusive of the side 86, to facilitate positioning of the cover around, but not over, adjacent portions of the neck 58 and the fretboard 60 which overlap the guitar top 52, in the vicinity of the neckjoint. A second cut-out portion 92 is formed in the portion of the perimeter of the cover 78, inclusive of the side 88, to facilitate positioning of the cover around, but not over, adjacent portions of the bridge 54.

Two small spaced holes 94 and 96 are formed in the cover 78 adjacent opposite ends of each of the elongated holes 84, for providing a clearance of the cover 78 from engagement thereof with the heads of screws which adjustably secure the pickups 56 (FIGS. 3 and 4) with the guitar 48. Three larger spaced holes 98 are formed in the cover 78 near a portion of the side 88 to facilitate positioning of the cover around, but not onto, three of the four stems 68 (FIG. 5), which ultimately receive the knobs 66, and which extend outward from within the body 50, and from the top 52, of the guitar 48.

Figure 5:
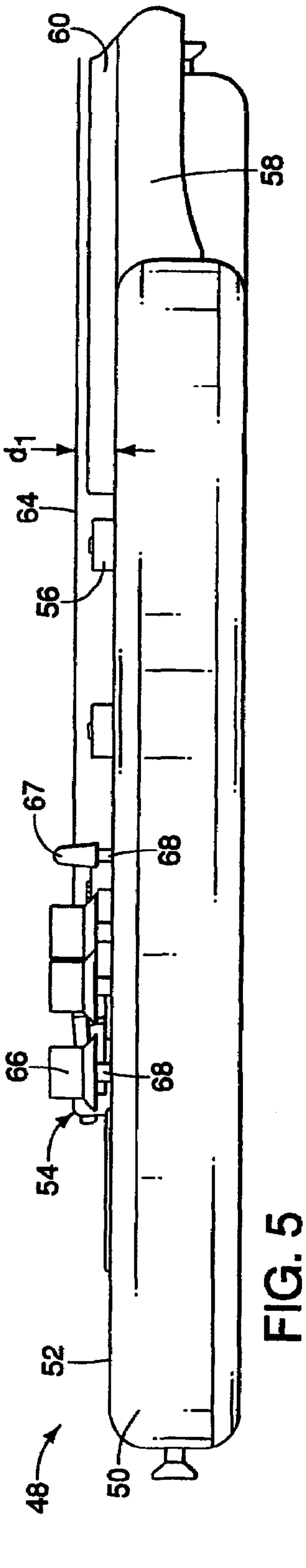
FIG. 5 is a partial side view showing the electric guitar of FIG. 2, without a pickguard or a cover.

A narrow elongated slit 100 is formed in the cover 78 to facilitate positioning of the cover around, but not over, an elongated slot formed in the guitar top 52, and through which the fourth stem, of the four stems 68, extends from the selector switch (not shown) mounted within the guitar body 50. The fourth stem 68 ultimately receives the cap 67 (FIG. 5). A pair of spaced holes 102 are formed in the cover 48, at opposite ends of the slit 100, for providing a clearance of the cover 78 from engagement thereof with the heads of screws which secure the selector switch with the guitar 48.

As described above with respect to FIG. 9, the functional purposes of the various holes formed in the cover 78, in accordance with the cover hole-location pattern, will remain the same for such functional purposes of the corresponding holes of the covers 78*a* and 78*b*, as described below with respect to FIGS. 10 and 11, respectively. Therefore, the functional purposes of the various corresponding holes of the covers 78*a* and 78*b*, being the same as that for the holes of the cover 78, will not be described below.

Referring to FIG. 10, and with respect to the cover 78*a*, holes 82*a*, 84*a*, 98*a* and 102*a* are slightly larger than the corresponding holes 82, 84, 98 and 102, respectively, of the cover 78 (FIG. 9). The holes 94 and 96 of the cover 78 (FIG. 9) have been enlarged to the extent that corresponding holes 94*a* and 96*a* of cover 78*a* are in communication with the respective ones of three elongated holes 84*a*, which correspond to the three elongated holes 84 (FIG. 9) of the cover 78. A slit 100*a* of the cover 78*a*, which corresponds to the slit 100 (FIG. 9) of the cover 78, has been widened and elongated to the extent that a pair of enlarged holes 102*a*, which correspond to pair of holes 102 (FIG. 9) of the cover 78, are in communication with the slit 100*a*. A first cut-out portion 90*a*, and a second cut-out portion 92*a*, of the cover 78*a*, correspond to the cut-out portions 90 and 92, respectively, of the cover 78 (FIG. 9).

Referring to FIG. 11, and with respect to the cover 78*b*, holes 82*b*, 84*b*, 94*b*, 96*b*, and 98*b* are slightly larger than the corresponding holes 82*a*, 84*a*, 94*a*, 96*a*, and 98*a*, respectively, of the cover 78*a* (FIG. 10). The holes 102*a* (FIG. 10) of the cover 78*a* have been enlarged to the extent that, in the cover 78*b*, they merge with, and become a part of a slit 100*b*, which is an enlargement of the slit 100*a* (FIG. 10). A first cut-out portion 90*b*, and a second cut-out portion 92*b*, of the cover 78*b*, correspond to the cut-out portions 90*a* and 92*a*, respectively, of the cover 78*a* (FIG. 10).

It is noted that the holes 82*b* have been enlarged, from the size of the holes 82 (FIG. 9) and 82*a* (FIG. 10), to the extent that the holes 82*b* are open through the perimeter of the cover 78*b*. Thus, each of a plurality of open passages is formed in the configured plastic sheet, in communication with a respective one of the holes 82*b*, with the open passage extending from the respective hole through the perimeter of the configured plastic sheet.

It is noted further that, with the exception of the holes 82*b*, which are referred to as perimeter-open holes, each of the holes 82, 84, 94, 96, 100 and 102, and the holes identified by the same numerals with the suffix letters "a" and "b," are formed with a surrounding enclosed border. As noted above, each of the perimeter-open holes 82*b* are formed with a partially enclosing border, with the respective open passage in communication with, and extending from, the respective hole 82*b* and through the perimeter of the covers 78*b* and 78*d*. When each of the covers 78*b* and 78*d* is placed in removable securance with the top 52, or the exposed outer surface of the pickguard 70, the perimeter-open holes 82*b* provide a liberal tolerance of the holes about the respective adjacent heads of the fasteners 76.

It is noted further that the decorative cover 78*d*, formed from the white plastic static cling sheet, with the cover perimeter pattern of the cover 78*b*, and with the holes arranged in the cover hole-location pattern of the cover 78*b*, is the preferred embodiment of the invention. However, the decorative cover 78*d* could also be formed from the clear plastic static cling sheet 80, with the cover perimeter pattern, and holes arranged in the cover hole-location pattern, of any of the clear covers 78, 78*a* and 78*b*, and any other covers for preassembled stringed instruments, without departing from the spirit and scope of the invention.

It is noted that, the musician can select any one of the four covers 78, 78*a*, 78*b*, or 78*d*, with the cover 78*d* having the same cover perimeter pattern and the same cover hole-location pattern as the cover 78*b*. If the cover 78 is selected, the various holes formed in the cover provide the closest hole tolerance, of any of the four covers 78, 78*a*, 78*b* and 78*d*, about the heads of the fasteners 76 (FIGS. 3 and 4). If either of the covers 78*b* or 78*d* is selected, the various perimeter-open holes 82*b* formed in the cover provide the most liberal hole tolerance, of any of the four covers, about the heads of the fasteners 76. If the cover 78*a* is selected, the various holes formed in the cover provide a moderate hole tolerance, which is intermediate of the above-noted closest tolerance and the above-noted most liberal tolerance, of any of the four covers 78, 78*a*, 78*b* and 78*d*, about the heads of the fasteners 76.

Referring to FIGS. 2 and 5, when the top 52 of the guitar body 50 of the preassembled guitar 48 is uncovered, i.e., the pickguard 70 is not assembled therewith, a defined space $d_1$ (FIG. 5) is located perpendicularly between the top and an adjacent portion of the strings 64, where the strings are parallel with each other, and the adjacent portion of the strings is parallel with the top.

Referring to FIGS. 3 and 6, when the pickguard 70 is in assembly with the preassembled guitar 48, a portion of the top 52 of the guitar body 50 is covered by the pickguard 70, whereby a defined space $d_2$ (FIG. 6) is located perpendicularly between the top of the pickguard and an adjacent portion of the strings 64, where the strings are parallel with each other, and the adjacent portion of the strings is parallel with the top.

Any graphic design such as, for example, the graphic design 110, can be printed on, or applied to, the uncovered first major surface of the clear plastic static cling sheet 80, or the white plastic static cling sheet, and could include, but is not limited to, any shape or line, or combination of lines, which are shaped to form displays of one or more configurations. The graphic designs could also include any expressions using letters of the alphabet, or numbers, or the like, and/or could include human anatomy images. Further, any of the graphic designs which are to be printed on, or applied to, the uncovered first major surface of the clear plastic static cling sheet 80, or the white plastic static cling sheet, can be displayed in one or more colors ultimately to present a colorful and decorative design on the cover 78*d*, which is pleasing to the eye and exhibits aesthetic qualities.

Some of the graphic designs, which are printable on, or can be applied to, the clear plastic static cling sheet 80, or to the white plastic static cling sheet, contain features which convey a graphic appearance correlating to commonly used terms and expressions such as, for example, swirl, tubes, skull, eye, lava, pearl, blender, vortex, droplets, spinz, dripper, glass, lips, plasma and frost. Each of the designs identified by the above-listed terms and expressions, all of which can be multicolored, are representative of, but are not limited to, graphic designs which can be printed on, or applied to, the clear plastic static cling sheet 80, or the white plastic static cling sheet, to form the cover 78*d*. Any other graphic design, of personal choice, in color or otherwise, can be printed on, or applied to, the clear plastic static cling sheet 80, or the white plastic static cling sheet, to form the cover 78*d*, without departing from the spirit and scope of the invention.

Each of the static cling covers 78, 78*a* and 78*b*, can be formed from the clear static cling vinyl, and with or without the decorative graphic design. In addition, each of the static cling covers 78 and 78*a* can be formed from the white static cling vinyl, and with the decorative graphic design. As described above, the cover perimeter pattern and the cover hole-location pattern of the cover 78*d* is identical to the same patterns of the cover 78*b*. For description purposes, the cover 78*b* refers to a cover which has been formed from the clear static cling vinyl, and with or without the decorative graphic design. Similarly, the cover 78*d* refers to a cover which has been formed from the white static cling vinyl, and with the decorative graphic design.

Each of the so formed covers 78, 78*a*, 78*b* and 78*d* can be applied directly to a surface of a preassembled stringed instrument, such as, for example, the top 52 of the guitar 48, or to the exposed outer surface of the pickguard 70, when the pickguard is attached to, and forms a component of, the preassembled instrument.

In the immediately following paragraphs, reference will be made to the cover 78*d*, and the purposes of the first major surface thereof. It is to be understood that the following description regarding the purposes of the first major surfaces of the cover 78*d* will also be descriptive of the purpose of the first major surface of each of the covers 78, 78*a* and 78*b*.

The first major surface of the cover 78*d*, with the decorative graphic design, provides the preassembled stringed instrument with a covering in a critical area of the instrument, typically subjected to abuse. In this manner, the first major surface of the cover 78*d* forms a wear surface which, when the cover is placed in removable securance with the guitar top 52, or the exposed outer surface of the preassembled pickguard 70, will absorb abuse to which the top, or the exposed outer surface of the pickguard, may be subjected by forces externally of the preassembled stringed instrument.

In addition, the first major surface of the cover 78*d* provides a base for the decorative graphic design printed thereon, or applied thereto, to provide visible aesthetic enhancement for the preassembled stringed instrument, as described above.

Further, when the covers 78, 78*a* and 78*b* are formed from the clear static cling vinyl, and without the decorative graphic design, the first major surface of each of these three covers, and the transparency of the covers, provides for the visible display of the attractive finish of the guitar top 52, or the exposed outer surface of the preassembled pickguard 70, if attached to the instrument.

Figure 12:
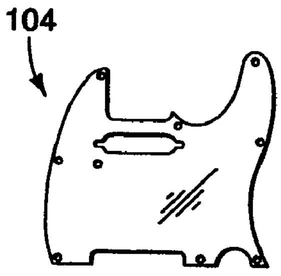
FIG. 12 is a top view showing a cover for a guitar, formed in a fifth of the several patterns, in accordance with certain principles of the invention.
Figure 13:
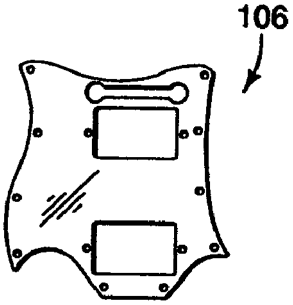
FIG. 13 is a top view showing a cover for a guitar, formed in a sixth of the several patterns, in accordance with certain principles of the invention.
Figure 14:
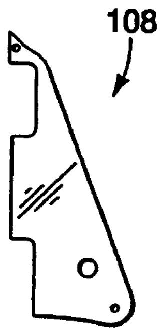
FIG. 14 is a top view showing a cover for a guitar, formed in a seventh pattern of the several patterns, in accordance with certain principles of the invention.

Referring to FIGS. 12, 13 and 14, each of three additional embodiments of covers 104, 106 and 108, respectively, are formed with a perimeter pattern and a hole-location pattern, which are different from the perimeter patterns and hole-location patterns of the remaining two of the three additional embodiments of covers. Further, each of the cover perimeter patterns and the cover hole-location patterns of the covers 104, 106 and 108 are different from the cover perimeter pattern and the cover hole-location patterns of the covers 78, 78*a*, 78*b* and 78*d*. The covers 104, 106 and 108 are examples of other covers, which can be used with preassembled stringed instruments other than the guitar 48, without departing from the spirit and scope of the invention.

It is noted that the clear static cling vinyl and the white static cling vinyl are commercially available in rolls of considerable length, as noted below, from which the covers 78, 78*a*, 78*b* and 78*d* can be made, in serial fashion. Further, where a plurality of each the covers 78, 78*a*, 78*b* and 78*d* are to be made in serial fashion from the rolls of the above-noted clear vinyl and/or white vinyl, commercially-available equipment, as noted below, which are referred to as printer/cutters, can be used to produce the covers.

It is to be understood that the clear plastic static cling sheet 80 (FIG. 15), or the white plastic static cling sheet, can be representative of successive portions of a roll of the clear or white static cling vinyl, from which a plurality of the covers can be produced, without departing from the spirit and scope of the invention.

In the immediately following paragraphs, a cover-assembly process will be described for assembling and removably securing, by static cling, the decorative cover 78*d* onto the top 52 of the preassembled guitar 48, which does not have the pickguard 70 assembled therewith, as shown in FIGS. 2 and 5. It is noted that, in this instance, since the pickguard 70 is not in assembly with the guitar 48, the decorative cover 78*d* does not have to be formed with the holes 82*b* (FIG. 11).

Also, the below-described cover-assembly process will include reference to the assembling and removable securance, by static cling, of the preferred embodiment of the decorative cover 78*d* with the preassembled guitar 48, which has the pickguard 70 assembled therewith, as illustrated in FIGS. 3 and 6, where the decorative cover is formed with the small perimeter-open holes 82*b*.

It is noted that the covers 78, 78*a* and 78*b*, 104, 106 and 108, can be assembled with a preassembled guitar, with or without the pickguard 70, in the same manner as described below with respect to the assembly of the cover 78*d* with the preassembled guitar 48.

When the decorative cover 78*d* is to be attached, by static cling, to the preassembled guitar 48, which does not have the pickguard 70 assembled therewith (FIGS. 2 and 5), the backing sheet is removed from the second major surface of the cover. The cover 78*d* is then positioned for movement, and is eventually moved, laterally into the space $d_1$, with the now-uncovered second major surface of the cover arranged to face, but be spaced from, the guitar top 52, and with the first major surface of the cover, which has the graphic design thereon, arranged to face, but be spaced from, the guitar strings 64.

As the cover 78*d* is moved into the space $d_1$, leading portions of the moving cover 78*d* are moved laterally through the adjustable pickup-to-strings space, which, as noted above, has a pickup-to-strings distance greater than 7.5 mil. In this manner, the relative thinness of the cover 78*d* facilitates movement of the cover through the pickup-to-strings space with ease.

The decorative cover 78*d* is then manipulated to align each of the three holes 84*b* with a respective one of the three pickups 56, which extend outward from the guitar top 52 toward the guitar strings 64. As the three holes 84*b* are being aligned as noted above, the holes 94*b* and 96*b* will be aligned with the heads of the adjustable mounting screws which retain the three pickups 56 with the guitar 48. Also, each of the three holes 98*b* and the slit 100*b* are aligned with a respective one of the four stems 68, which extend outward from within the guitar body 50 and from the guitar top 52. In this manner, the cover 78*d* is aligned for placement on the top 52 of the guitar 48.

The aligned cover 78*d* is then moved toward, and into pressing engagement with the guitar top 52. In this manner, the first major surface of the cover 78*d* is pressed into engagement with the guitar top 52, whereby the static cling property of the cover facilitates the removable securance of the cover with the preassembled guitar 48.

When the decorative cover 78*d* is to be attached, by static cling, to the preassembled guitar 48, which has the pickguard 70 assembled therewith (FIGS. 3 and 6), the backing sheet is removed from the second major surface of the cover. The cover 78*d* is then positioned for movement, and is eventually moved, laterally into the space $d_2$, with the now-uncovered second major surface of the cover arranged to face, but be spaced from, the exposed outer surface of the pickguard, and with the first major surface of the cover, which has the graphic design thereon, arranged to face, but be spaced from, the guitar strings 64.

As the cover 78*d* is moved into the space $d_2$, leading portions of the moving cover 78*d* are moved laterally through the adjustable pickup-to-strings space, which, as noted above, has a pickup-to-strings distance greater than 7.5 mil. In this manner, the relative thinness of the cover 78*d* facilitates movement of the cover through the pickup-to-strings space with ease.

The decorative cover 78*d* is then manipulated to align each of the perimeter-open holes 82*b* with a respective one of the heads of the screws 76, which secure the pickguard 70 with the guitar 48. Additionally, the three holes 84*b* are aligned with a respective one of the three pickups 56, which extend outward from the guitar top 52 toward the guitar strings 64.

As the three holes 84*b* are being aligned as noted above, the holes 94*b* and 96*b* will be aligned with the heads of the adjustable mounting screws which adjustably retain the three pickups 56 with the guitar 48. Also, each of the three holes 98*b* and the slit 100*b* are aligned with a respective one of the four stems 68, which extend outward from within the guitar body 50 and from the guitar top 52. In this manner, the cover 78*d* is aligned for placement of the second major surface of the cover on the exposed outer surface of the pickguard 70.

The aligned cover 78*d* is then moved toward, and the second major surface of the cover is moved into pressing engagement with, the exposed outer surface of the pickguard 70, whereby the static cling property of the cover facilitates the removable securance of the cover with the pickguard.

When, as described above, the cover 78*d* is removably secured, by static clinging, to the guitar body 52, or to the pickguard 70, the graphic design on the first major surface of the cover will face outward from the guitar 48 and be exposed for visual observation and aesthetic appearance.

If the user wishes to display a different or second graphic design on the guitar 48, which is different from the existing or first graphic design on the cover 78*d*, the cover with the first graphic design is removed by reversing the above-described assembly process. Thereafter, the above-described cover-assembly process is followed to removably secure the cover 78*d*, with the second graphic design, onto the guitar 48. This process of replacing the first cover 78*d* having the first graphic design, with the second cover 78*d* having the second graphic design, can be accomplished quickly, generally within a few minutes, which is a significantly less than the time to replace one pickguard 70 with another pickguard.

Additionally, between the presentation of two successive songs by use of the guitar 48, the musician can exchange the cover 78*d*, having the first graphic design thereon with another cover 78*d*, having the second graphic design thereon. This allows the musician to display different graphic designs for successively performed songs, where each design is related to a respective one of the songs.

It is well known that static cling vinyl is a special formulation of polyvinyl chloride to which a large amount of plasticizer, in liquid form, has been added. Such a vinyl is a durable and exceptionally pliable material, and is calendered to provide a smooth finish, which, when applied to a clean, smooth, glossy surface, adheres firmly without the need for any other means of securance, such as, for example, an adhesive. Further, static cling vinyl can be removed from the surface to which it is removably secured and reapplied many times without leaving any residue on the surface to which it has been secured.

Static cling vinyl, which is a durable plastic, is commercially available from many sources. One such source is Graphic Materials International ("GMI"), having an office in Calabasas, Calif., which offers roll stock, 30 yards in length, of a clear static cling vinyl, having a thickness of 7.5 mil, under Product No. SPMHSC3030N (30 inches wide), and Product No. SPMHSC5430 (54 inches wide). GMI also offers roll stock, 30 yards in length, of white static cling vinyl, having a thickness of 7.5 mil, under Product No. SPMHSW3030N (30 inches wide), and Product No. SPMHSW5430 (54 inches wide).

Printer/cutter equipment for producing the covers 78, 78*a*, 78*b* and 78*d*, when using roll stock of static cling vinyl, are available from many sources. One such source is Roland DGA Corporation ("Roland"), having an office in Irvine, Calif., which offers several printer/cutter models, including Roland's SOLJET SC-500 and Roland's VersaCAMM® SP-300V and SP-540V. "VersaCAMM" is a registered U.S. trademark owned by Roland. The Roland printer/cutters use Roland's ECO SOL inks, and include software which is loaded with print profiles and advanced cutting features.

The covers 78, 78*a*, 78*b*, 78*d*, 104, 106 and 108, and any other cover for preassembled stringed instruments, can be made by many printing houses including, for example, Signsations, Inc., having an office in Timonium, Md.

The above-described static cling cover with the decorative graphic design further provides the preassembled stringed instrument with the visible appearance of a custom painted surface, which can be exchanged with a cover having a different decorative graphic design within a matter of minutes. The cover without the design, which is clear, also allows the covered attractive surface of the stringed instrument, or the covered surface of the pickguard, to be visible.

Each of the above-described static cling covers, with or without the decorative graphic design, does not alter or damage the covered surface of the stringed instrument, or the pickguard. Such static cling covers are removable, and easy to apply to the stringed instrument or the pickguard, thereby requiring no adhesive, tools or other facilities to apply the cover to the instrument or the pickguard.

In the above-described process, the cover, with or without the decorative design, can be applied to the critical surface of the stringed instrument, or the preassembled pickguard, without disassembling any components of the preassembled instrument, to locate the cover between strings of the instrument and an immediately adjacent surface of the instrument.

In general, the above-identified embodiments are not to be construed as limiting the breadth of the present invention. Modifications, and other alternative constructions, will be apparent which are within the spirit and scope of the invention as defined in the appended claims.

What is claimed is:

1. A cover for assembly with a preassembled stringed instrument having a top and a mount extending from the top, with the mount forming a component of the preassembled stringed instrument and having a base perimeter at a juncture of the mount and the top, and the preassembled stringed instrument further having pre-strung strings secured to the instrument at spaced portions of the strings, with adjacent sections of the pre-strung strings, which extend between the spaced portions thereof, extending over a portion of the top of the instrument to form a space between the top and the sections of the pre-strung strings, which comprises:

a configured plastic sheet having a static cling property to facilitate direct removable static-cling securance of the sheet to at least a portion of the top between the top and the sections of the pre-strung strings of the preassembled stringed instrument; and the configured plastic sheet being formed with a prescribed thickness which facilitates movement of the sheet within the space between the top and the sections of the pre-strung strings, and direct placement of at least portions of the sheet about at least portions of the base perimeter of the mount, when the cover is removably static-cling secured with the top of the preassembled stringed instrument adjacent the mount.

2. The cover as set forth in claim 1, wherein the mount is a component of the preassembled stringed instrument selected from the group consisting of an electric pickup, an electrical control stem, a bridge, a neck, a fretboard, and a fastener and head thereof.

3. The cover as set forth in claim 1, which further comprises:

the configured plastic sheet having a first major surface which will face away from the top and toward the pre-strung strings, as the cover is placed in removable static-cling securance with the top;

the configured plastic sheet having a second major surface, located on a side of the configured plastic sheet opposite the first major surface, for engaging the top of the preassembled stringed instrument, as the cover is placed in removable static-cling securance with the top; and the first major surface forming a wear surface which, when the cover is placed in removable static-cling securance with the top of the preassembled stringed instrument, the wear surface will absorb abuse to which the top may be subjected by forces externally of the preassembled stringed instrument.

4. A cover for assembly with a preassembled stringed instrument having a top and a preassembled pickguard secured to the to and forming a component of the preassembled stringed instrument, the pickguard being formed with an exposed outer surface, the preassembled stringed instrument further having pre-strung strings secured to the instrument at spaced portions of the strings, with adjacent sections of the pre-strung strings, which extend between the spaced portions thereof, extending over a portion of the outer surface of the pickguard to form a space between the pickguard and the sections of the pre-strung strings, which comprises:

the configured plastic sheet having the static cling property to facilitate removable static-cling securance of the cover to the at least a portion of the exposed outer surface of the preassembled pickguard; and the configured plastic sheet being formed with a prescribed thickness which facilitates movement of the sheet within the space between the at least a port ion of the outer surface of the pickguard and the sections of the pre-strung strings, and direct placement of at least a portion of the sheet onto the at least a portion of the outer surface of the pickguard, when the cover is removably static-cling secured with the preassembled stringed instrument.

5. The cover as set forth in claim 4, wherein the preassembled pickguard is formed with a prescribed pickguard perimeter pattern, which further comprises:

the configured plastic sheet being formed with a perimeter in the form of a cover perimeter pattern which is identical to the prescribed pickguard perimeter pattern.

6. The cover as set forth in claim 1, which further comprises:

the configured plastic sheet having a first major surface which will face away from the top and toward the plurality of strings, when the cover is placed in removable securance with the top;

the configured plastic sheet having a second major surface, located on a side of the configured plastic sheet opposite the first major surface, for engaging the top of the preassembled stringed instrument, when the cover is placed in removable securance with the top; and a graphic design formed on the first major surface of the configured plastic sheet which, when the cover is in removable securance with the top of the stringed instrument, is visible externally of the preassembled stringed instrument.

7. The cover as set forth in claim 6, wherein the graphic design is comprised of multiple colors.

8. The cover as set forth in claim 1, which further comprises:

the configured plastic sheet being formed with a hole therethrough which is positionable about the mount, when the cover is in removable securance with the top of the preassembled stringed instrument.

9. The cover as set forth in claim 1, which further comprises:

the configured plastic sheet having a perimeter;

the configured plastic sheet formed with a hole therethrough which is positionable at least partially about the mount, when the cover is placed in removable securance with the top; and an open passage which communicates with the hole formed in the configured plastic sheet and which extends from the hole through the perimeter of the configured plastic sheet.

10. A cover for assembly with a preassembled stringed instrument having a top, and further having pre-string strings secured to the instrument at spaced portions of the strings, with adjacent sections of the pre-strung strings. which extend between the spaced portions thereof, extending adjacent at least a portion of the top, and with a defined space of the preassembled stringed instrument being located, by a prescribed distance, between the sections of the pre-strung strings and the at least a portion of the top, which comprises:

a configured plastic sheet having a static cling property to facilitate removable static-cling securance of the cover to the portion of the top of the preassembled stringed instrument; and the configured plastic sheet being formed with a thickness dimension, which is less than the prescribed distance, to allow the cover to be moved laterally into the defined space between the sections of the pre-strung strings and the portion of the top of the instrument, and into removable static-cling securance with at least the portion of the top of the preassembled stringed instrument.

11. The cover as set forth in claim 10, which further comprises:

the configured plastic sheet being flexible to facilitate maneuverability of the cover as the cover is being moved into the defined space, and eventually into removable securance with at least the portion of the top of the preassembled stringed instrument.

12. The cover as set forth in claim 10, where the preassembled stringed instrument further includes a preassembled pickguard attached to the top, with the section of the pre-strung strings extending adjacent a portion of an exposed outer surface of the pickguard, with a defined space of the preassembled stringed instrument being located, by a prescribed distance, between the section of the pre-strung strings and the portion of the outer surface of the pickguard, which comprises:

the configured plastic sheet having a static cling property to facilitate removable static-cling securance of the cover to the pickguard; and the configured plastic sheet being formed with a thickness dimension, which is less than the prescribed distance, to allow the cover to be moved laterally into the defined space between the section of the pre-strung strings and the outer surface of the pickguard, and into removable securance with at least the portion of the outer surface of the pickguard.

13. The cover as set forth in claim 12, which further comprises:

the configured plastic sheet being formed with a major surface; and a graphic design applied to the major surface, with the graphic design being visible externally of the stringed instrument when the cover is placed into removable static-cling securance with outer surface of the pickguard.

14. A cover for assembly with a preassembled stringed instrument having a top, an electric pickup, with an outboard surface, extending outward from the top, and the instrument further having pre-strung strings secured to the instrument at spaced portions of the strings, with adjacent sections of the pre-strung strings, which extend between the secured spaced portions thereof, extending adjacent the electric pickup, and with a defined space of the pre-assembled stringed instrument being located, by a prescribed distance, between the sections of the pre-strung strings and the outboard surface of the electric pickup, which comprises:

a configured plastic sheet having a static cling property to facilitate removable static-cling securance of the cover to the top of the stringed instrument; and the configured plastic sheet being formed with a thickness dimension, which is less than the prescribed distance, to allow the cover to be moved laterally into the defined space between the sections of the pre-assembled strings and the electric pickup, and into removable static-cling securance with the preassembled stringed instrument.

15. The cover as set forth in claim 14, which further comprises:

the configured plastic sheet being formed with a major surface; and a graphic design applied to the major surface, with the graphic design being visible externally of the stringed instrument when the cover is placed into removable securance with the preassembled stringed instrument.

16. The cover as set forth in claim 14, which further comprises:

the configured plastic sheet having a first major surface which will face away from the top and toward the strings, when the cover is placed in removable securance with the top;

the configured plastic sheet having a second major surface, located on a side of the configured plastic sheet opposite the first major surface, for engaging the top of the preassembled stringed instrument, when the cover is placed in removable securance with the top; and the first major surface forming a wear surface which, when the cover is placed in removable securance with the top of the preassembled stringed instrument, the wear surface will absorb abuse to which the top may be subjected by forces externally of the preassembled stringed instrument.

17. The cover as set forth in claim 14, wherein a pickguard, as a component of the preassembled stringed instrument, is secured to the top thereof, and located at least within the defined space, and is formed with an exposed outer surface, with a perimeter of the pickguard being formed in a prescribed pickguard perimeter pattern, which further comprises:

the configured plastic sheet having the static cling property to facilitate removable securance of the cover to at least portions of the exposed outer surface of the pickguard; the configured plastic sheet being formed with a perimeter; and the perimeter of the configured plastic sheet being formed in a cover perimeter pattern which is identical to the prescribed pickguard perimeter pattern.

18. The cover as set forth in claim 14, which further comprises:

the configured plastic sheet having a first major surface which will face away from the top and toward the strings, when the cover is placed in removable securance with the top;

the configured plastic sheet having a second major surface, located on a side of the configured plastic sheet opposite the first major surface, for engaging the top of the preassembled stringed instrument, when the cover is placed in removable securance with the top; and a graphic design formed on the first major surface of the configured plastic sheet which, when the cover is in removable securance with the top of the stringed instrument, is visible externally of the preassembled stringed instrument.

19. The cover as set forth in claim 18, wherein the graphic design is composed of multiple colors.

20. The cover as set forth in claim 18, which further comprises:

the first major surface forming a wear surface which, when the cover is placed in removable securance with the top of the preassembled stringed instrument, the wear surface will absorb abuse to which the instrument may be subjected by forces externally of the preassembled stringed instrument.

21. The cover as set forth in claim 17, wherein the pickguard is secured to the top of the preassembled stringed instrument by at least one fastener having a head which extends at least partially outward from the pickguard, which further comprises:

the configured plastic sheet formed with a hole therethrough which is positionable at least partially about the head of the fastener, when the cover is placed in removable securance with the pickguard; and an open passage which communicates with the hole formed in the configured plastic sheet and extends from the hole through the perimeter of the configured plastic sheet.

22. The cover as set forth in claim 14, which further comprises:

the configured plastic sheet being formed with a hole therethrough, with the hole being configured to be complementary to the configuration of a base perimeter of the electric pickup, to facilitate surrounding placement of the hole about the electric pickup, when the cover is in removable securance with the preassembled stringed instrument.

23. A guitar, which comprises:

a body formed with a top ;

a plurality of strings extending spatially and interfacingly over an adjacent portion of the top to form a prescribed space at a prescribed distance between the adjacent portion of the top and the plurality of strings;

a plastic cover, having a static cling property, formed with a thickness less than the prescribed distance, and a flexibility, to facilitate positioning of the cover within the prescribed space and onto at least the adjacent portion of the top; and the plastic cover removably secured by static clinging engagement to the adjacent portion of the top of the body of the guitar.

24. The guitar as set forth in claim 23, which further comprises, the plastic cover formed with a first major surface;

the plastic cover formed with a second major surface, on a side of the plastic cover opposite from the first side of the plastic cover, in engagement with the top; and a graphic design formed on the first major surface of the plastic cover.

25. The guitar as set forth in claim 24, which further comprises:

the graphic design being comprised of multiple colors.

26. The guitar as set forth in claim 23, which further comprises:

the cover being formed with a major surface; and the major surface forming a wear surface which, when the cover is placed in removable securance with the top of the guitar, the wear surface will absorb abuse to which the top may be subjected by forces externally of the guitar.

27. The guitar as set forth in claim 23, which further comprises:

a pickguard attached to the top and located between the top and the plurality of strings;

a mount extending outward from the pickguard; and the plastic cover being formed with a hole located about at least a portion of the mount and removably secured to an outer surface of the pickguard by the static cling properties of the cover.

28. The guitar as set forth in claim 27, which further comprises:

the plastic cover having a perimeter; and an open passage formed in the plastic cover, which communicates with the hole formed in the plastic cover and which extends from the hole through the perimeter of the plastic cover.

29. The guitar as set forth in claim 27, which further comprises:

the pickguard being formed with a perimeter in a prescribed pickguard perimeter pattern; and the plastic cover being formed with a perimeter in a cover perimeter pattern which is identical to the prescribed pickguard perimeter pattern.

30. The guitar as set forth in claim 27, which further comprises:

the pickguard being formed with at least one hole in accordance with a prescribed pickguard hole-location pattern; and the plastic cover being formed with at least one hole in accordance with a cover hole-location pattern which is identical to the prescribed pickguard hole-location pattern.

31. A method of making a cover for static clinging attachment thereof to a preassembled stringed instrument, which comprises the steps of:

forming a plastic sheet having a static cling property;

determining a cover perimeter pattern for a perimeter of the plastic sheet;

determining the configuration of a mount of the preassembled stringed instrument, which extends in an outward direction from the top toward strings of the preassembled stringed instrument, and which is to remain exposed after the cover is in static clinging assembly with the preassembled stringed instrument;

determining the location of the mount with respect to the cover perimeter pattern of the plastic sheet; and selectively shaping the plastic sheet to form the perimeter of the cover in the cover perimeter pattern and to form a hole in the plastic sheet in the configuration of the mount and at the location of the mount with respect to the cover perimeter pattern.

32. The method as set forth in claim 31, which further comprises the step of:

forming an open passage in the plastic sheet which is in communication with the hole and which extends from the hole through the perimeter of the cover.

33. The method as set forth in claim 31, which further comprises the step of:

attaching a pickguard to the top of the preassembled stringed instrument, where the pickguard is formed with a prescribed pickguard perimeter pattern, and wherein the cover perimeter pattern is the same as the prescribed pickguard perimeter pattern.

34. The method as set forth in claim 31, which further comprises the step of:

applying a graphic design to a surface of the plastic sheet; and retaining at least portions of the graphic design on a surface of the cover after the plastic sheet has been shaped to form the cover, where the graphic design will be visible after the cover has been placed in static clinging attachment to the preassembled stringed instrument.

35. The method as set forth in claim 34, wherein the step of applying a graphic design further comprises the step of:

applying the graphic design in a multi-colored array.

36. A method of making a cover for static clinging attachment thereof to a pickguard attached to a top of a preassembled stringed instrument, wherein a perimeter of the pickguard is formed in a prescribed pickguard perimeter pattern, and with a plurality of holes located in accordance with a prescribed pickguard hole-location pattern established with respect to the prescribed pickguard perimeter pattern, which comprises the steps of:

forming a plastic sheet having a static cling property; and selectively shaping the plastic sheet to form the cover, with a perimeter of the cover being in a cover perimeter pattern, which is the same as the prescribed pickguard perimeter pattern, and with a plurality of openings of the cover being in accordance with a cover hole-location pattern, which is the same as the prescribed pickguard hole-location pattern.

37. A method of assembling a cover with a preassembled guitar having a body, a top, at least one pickup extending in a direction outward from the top, and strings over the pickup, with the strings being spaced from the at least one pickup by a prescribed pickup-to-strings space having a prescribed pickup-to-strings distance, which comprises the steps of:

forming the cover from a plastic sheet having a static cling property and having a thickness dimension which is less than the prescribed pickup-to-strings distance;

forming a hole through the cover in a configuration complementary to a configuration of the pickup;

moving the cover within the prescribed pickup-to-strings space to position the cover between the pickup and the strings; and moving the positioned cover toward and into engagement with the preassembled guitar so that the hole is positioned about the pickup, and the cover is attached to the preassembled guitar by the static cling property of the cover.

38. The method as set forth in claim 37, which further comprises the step of:

applying a graphic design to one surface of the plastic sheet, with a portion of the graphic design remaining on one surface of the cover for visible display following assembly of the cover with the preassembled guitar.

39. A method of assembling a cover with a preassembled guitar having a body, a top, and strings, with spaced portions of a section of the strings being attached at opposite ends thereof to spaced portions of the guitar, and with the section of the strings and the top forming a prescribed space therebetween and separated by a prescribed distance, which comprises the steps of:

forming the cover from a plastic sheet having a static cling property and having a thickness dimension which is less than the prescribed distance;

positioning the cover within the prescribed space to locate the cover as a positioned cover between the top and the section of the strings;

moving the positioned cover toward and into engagement with the top; and attaching the positioned cover to the top by the static cling property of the cover.

40. The method as set forth in claim 39, which further comprises the step of:

forming the plastic sheet from a flexible material.

41. A cover f or assembly with a preassembled stringed instrument having a top and pre-strung strings secured to the instrument at spaced portions of the strings, with sections of the pre-strung strings, which extend between the spaced portions thereof, extending over a portion of the top of the instrument to form a space between the top and the section of the pre-strung strings, which comprises:

a configured plastic sheet having a static cling property to facilitate direct removable static-cling securance of the sheet to at least a portion of the top between the top and the sections of the pre-strung strings of the preassembled stringed instrument; and the configured plastic sheet being formed with a prescribed thickness which facilitates movement of the sheet within the space between the top and the sections of the pre-strung strings, and direct placement of at least portions of the sheet onto the at least a portion of the top, as the cover is removably static-cling secured with the top of the preassembled stringed instrument.

* * * * *